United States Patent
Muthu et al.

(10) Patent No.: US 6,495,964 B1
(45) Date of Patent: Dec. 17, 2002

(54) LED LUMINAIRE WITH ELECTRICALLY ADJUSTED COLOR BALANCE USING PHOTODETECTOR

(75) Inventors: Subramanian Muthu, Ossining, NY (US); Chin Chang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 49 days.

(21) Appl. No.: 09/749,154

(22) Filed: Dec. 27, 2000

Related U.S. Application Data

(63) Continuation-in-part of application No. 09/216,262, filed on Dec. 18, 1998, now Pat. No. 6,127,783.

(51) Int. Cl.$^7$ ............................................. H05B 37/02
(52) U.S. Cl. ...................... 315/149; 315/312; 315/307; 315/360; 250/214 AL; 250/214 C; 250/553
(58) Field of Search ................................. 315/291, 307, 315/360, 149, 312, 152, 154, 158, 169.3, 224, 362; 250/214 AL, 214 C, 216, 552, 553; 362/800

(56) References Cited

U.S. PATENT DOCUMENTS

| | | | |
|---|---|---|---|
| 3,760,174 A | * 9/1973 | Boenning et al. | 315/312 |
| 4,810,937 A | * 3/1989 | Havel | 250/205 |
| 5,268,828 A | * 12/1993 | Miura | 362/249 |
| 5,301,090 A | * 4/1994 | Hed | 362/101 |
| 5,471,052 A | * 11/1995 | Ryczek | 250/214 C |
| 6,095,661 A | * 8/2000 | Lebens et al. | 315/224 |
| 6,127,783 A | 10/2000 | Pashley et al. | 315/149 |

* cited by examiner

Primary Examiner—Haissa Philogene
(74) Attorney, Agent, or Firm—Aaron Waxler

(57) ABSTRACT

The combined light output (chromaticity) of a white light emitting LED luminaire is electronically controlled based on measurements by a single photodiode arranged to measure the light outputs of at least a plurality of the LEDs in the array. This is accomplished by measuring the light output of the LEDs in each color separately in a sequence of time pulses. For an array of red, green, and blue LEDs there are three time pulses in a measuring sequence. During each time pulse, the current for the color being measured is turned off. The response time of a typical photodiode is extremely short, so the measuring sequence can be performed in a sufficiently short time that an observer will not detect it (e.g. 10 ms). Measured light outputs for the colors are compared to desired outputs, which may be set by user controls, and changes to the power supply for the color blocks are made as necessary. Chromaticity is thus automatically controlled without regard to the factors which may cause it to change. The user inputs permit varying the desired chromaticity to either warm white (more red output) or cool white (more blue output).

24 Claims, 6 Drawing Sheets

LED LUMINAIRE WITH ELECTRICALLY ADJUSTED COLOR BALANCE USING PHOTODETECTOR

RELATED REFERENCES

This application is a continuation-in-part of a previously filed U.S. Pat. No. 6,127,783 issued Oct. 3, 2000 herein incorporated by reference.

BACKGROUND OF THE INVENTION

The invention relates to a luminaire with an array of light emitting diodes (LEDS), and more particularly to a white light emitting luminaire with a control system for adjusting the individual components to maintain a desired color balance (chromaticity).

U.S. Pat. No. 5,301,090 discloses an LED luminaire having an array of LEDs including a plurality of LEDs in each of the colors red, green and blue. The LEDs for each color are wired in parallel and provided with a separate power supply, and a diffusion screen is provided over the array. The chromaticity of the assembly is manually controlled by three knobs for the respective colors.

LEDs are not uniformly bright; for a given drive current, light output varies from chip to chip, and also varies over the life of each chip. Light output also varies inversely with temperature, but not uniformly for each color. Finally, in a block of LEDs of a given color, the light output will vary if one or more of the LEDs fails. Given all the factors, which can affect the color balance of any array of LEDs, it would be desirable to automatically monitor and regulate the color balance, especially in a white-light emitting luminaire.

It is known to control current to an array of LEDs in a given color based temperature, for example in a traffic light. This scheme would be cumbersome in a luminaire having LEDs in a plurality of colors, because the temperature (and therefore the light intensity) does not vary uniformly for the various colors.

U.S. Pat. No. 6,127,783 describes monitoring the color balance of a white luminaire composed of red, green, and blue LEDs, by separately reading the red, green, and blue channels with a single photodetector. During each measurement cycle, two colors are turned off for a period of milliseconds, while the intensity of the third color is measured. This technique was found to cause perceptible flicker.

Previously filed U.S. patent application Ser. No. 09/663,050 attempts to solve this problem by increasing the intensity of other colors slightly just before and after they are turned off. However, perceptible flicker still existed, introducing discomfort for the user.

It would be desirable to automatically control the chromaticity of a white light emitting luminaire, without regard to the factors which cause the light outputs of the individual colors to vary.

It would further be desirable to automatically control the chromaticity without resorting to a spectrally resolving light measuring system such as a photodiode and filter for each of the respective colors.

It would be additionally desirable to eliminate any perceptible flicker during the measurement cycle eliminating discomfort for the user.

SUMMARY OF THE INVENTION

According to the invention, the combined light output (chromaticity) of a white light emitting LED luminaire is electronically controlled based on measurements by a single photodiode arranged to measure the light outputs of at least a plurality of the LEDs in the array. This is accomplished by measuring the light output of the LEDs in each color separately in a sequence of time pulses. For an array of red, green, and blue LEDs there are three time pulses in a measuring sequence. During each time pulse, the current for the color being measured is turned off. The response time of a typical photodiode is extremely short, so the measuring sequence can be performed in a sufficiently short time that an observer will not detect it (e.g. 10 ms).

Measured light outputs for the colors are compared to desired outputs, which may be set by user controls, and changes to the power supply for the color blocks are made as necessary. Chromaticity is thus automatically controlled without regard to the factors which may cause it to change. The user inputs permit varying the desired chromaticity to either warm white (more red output) or cool white (more blue output).

In order to best compensate for temperature dependent changes during a warm-up phase, the electronic control circuitry may undertake the measuring sequence more frequently during warm-up. Less frequent measurements are sufficient to compensate for long term changes in the LEDs after a stable operating temperature is reached.

Where the LEDs in each color are wired in parallel, varying the current to the remaining LEDs during the next measuring sequence can automatically compensate the failure of an LED.

In accordance with one embodiment of the invention, the array of LEDs is driven by a current supply source that includes a measuring drive pulse having at least a "turn-off" portion. The LEDs in each color have a light output that has a nominal continuous value during ordinary operation and is interrupted during the "turn-off" portion. The array of LEDs has a combined light output when current is supplied by the current supply source. A photodiode takes two measurements. First, the photodiode measures the light outputs of all LEDs in the array. Second, the electrical current is selectively turned-off to one of the LEDs so that the photodiode measures the light output for the remaining colors in response to the measuring drive pulse. Measurement of the light output of the LED is determined by the difference between the first light level and the second light level.

These and additional advantages of the invention will be apparent from the drawing and description which follows.

DESCRIPTION OF THE PREFERRED EMBODIMENTS

Figure 1:
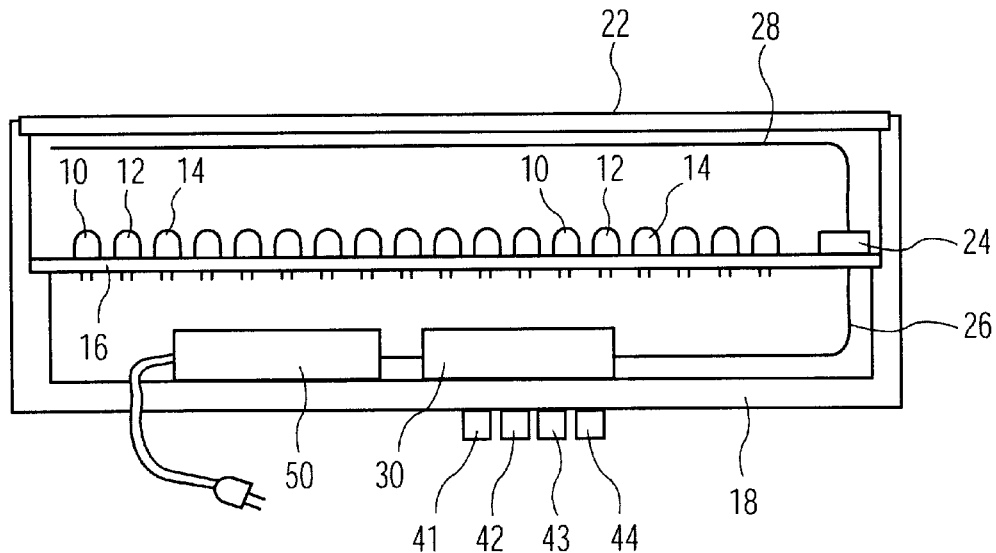
FIG. 1 is a cross-sectional view of an embodiment of a luminaire according to the invention, with an optical fiber light pick-up.

Referring to FIG. 1, an LED luminaire according to the invention includes a two-dimensional array of LEDs 10, 12, 14 including a plurality of LEDs in each of a plurality of colors. In the present case by the array includes red LEDs 10, green LEDs 12, and blue LEDs 14 mounted on a wired substrate 16 in a housing 18. The LEDs are arranged so that the overall light output will be white; a diffuser 22 mounted on the housing 18 is provided to enhance mixing. LEDs in additional colors, such as amber may be used to enhance the mixing options. The mixing optics may include means other than a diffuser.

A single photodiode 24 is arranged to sense the light intensity of all the LEDs in the array. In FIG. 1 an optical fiber extending along the length of the housing 18 sends light to the photodiode 24, which generates corresponding current signals for controller 30 via feedback line 26. For small arrays, the photodiode may be arranged to sense the light outputs directly. Large numbers of LEDs may be divided into arrays with a photodiode for each array, instead of the optical fiber arrangements depicted in FIG. 1.

Figure 2:
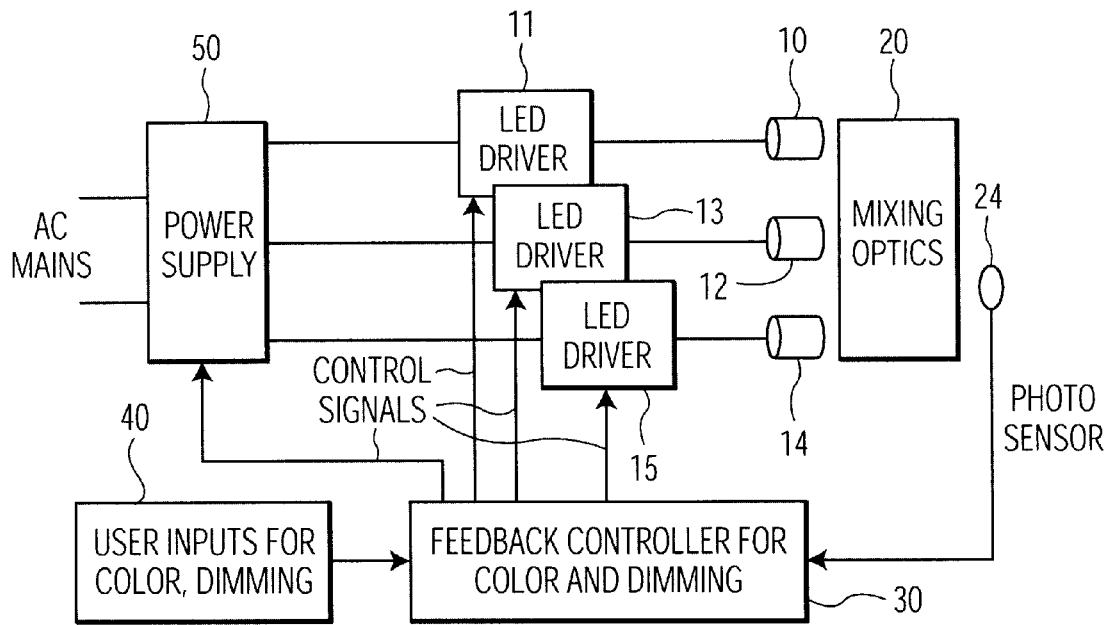
FIG. 2 is a schematic diagram of the luminaire of FIG. 1.

Referring also to FIG. 2, the controller 30 translates the feedback from the photodiode 24 into color point measurements which are compared with desired settings provided via user inputs 40. Based on the comparison, the controller 30 decides whether the desired color balance is present, and accordingly signals the LED drivers/current regulators 11,13,15 for the respective diodes 10,12,14. A power input from the power converter 50 is thus translated into current outputs which control the light intensity for the respective colors red, green, and blue to obtain the desired color balance. The diodes for each color of the array are kept at common potential by wiring on the substrate 16. User controls for the desired settings include inputs 41, 42, 43 for the respective colors, and dimmer 44 which controls overall intensity of the resulting white light.

Figure 3:
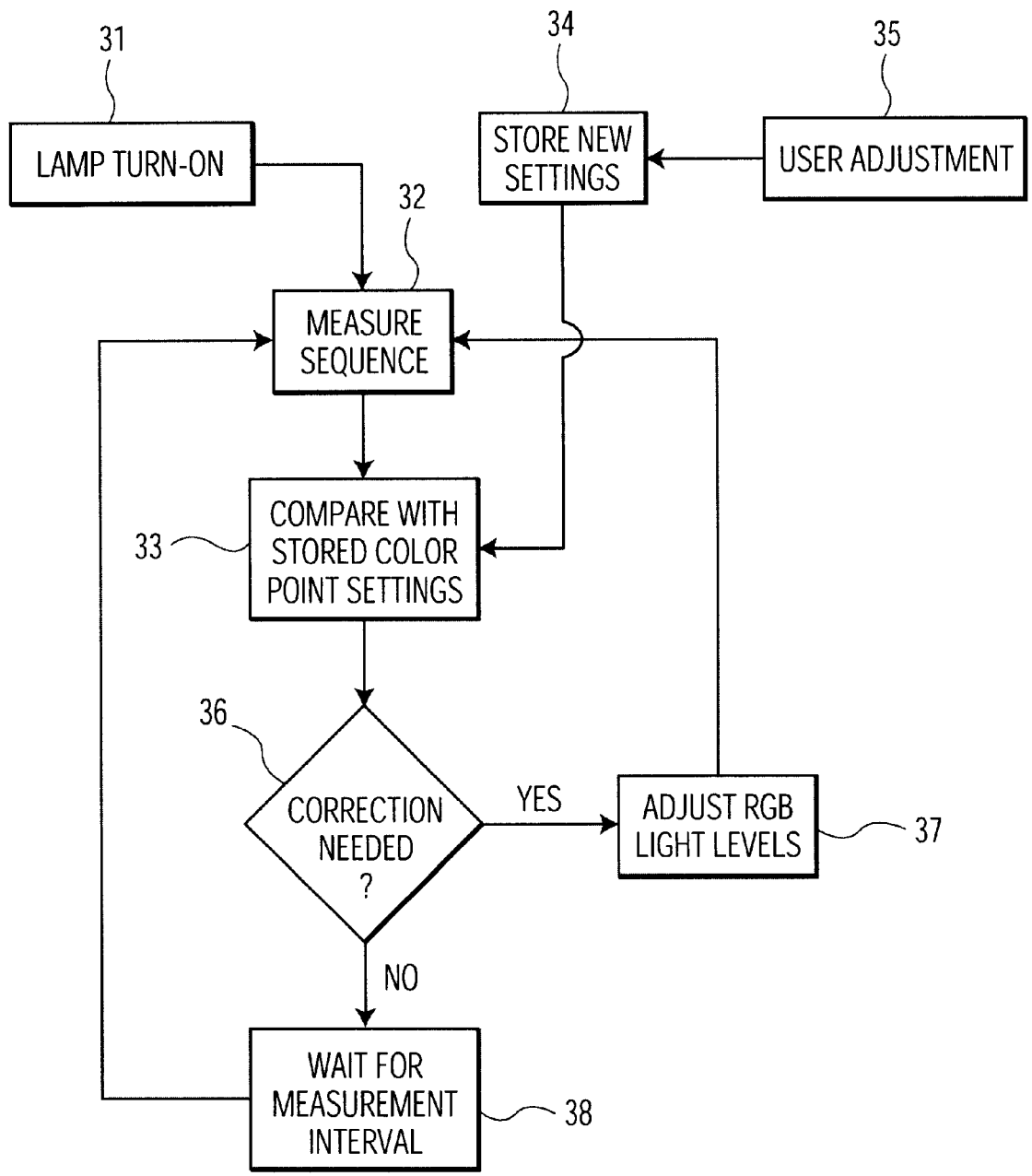
FIG. 3 is a diagram of a logic sequence for a controller in the luminaire of FIG. 1.

FIG. 3 depicts the control logic for the luminaire in a diagram. When the lamp is turned on (31), power is provided to the LEDs and a measuring sequence is initiated (32). Color point measurements are compared (33) with desired settings which are stored (34) pursuant to user adjustment (35). Based on this comparison, it is determined (36) whether color adjustments are necessary, and if so, adjustments are made (37) and the measuring sequence is repeated (32). If it is determined that color adjustments are not necessary (36), the controller will wait for a predetermined measuring interval (38) before repeating the measuring sequence (32).

Figure 4:
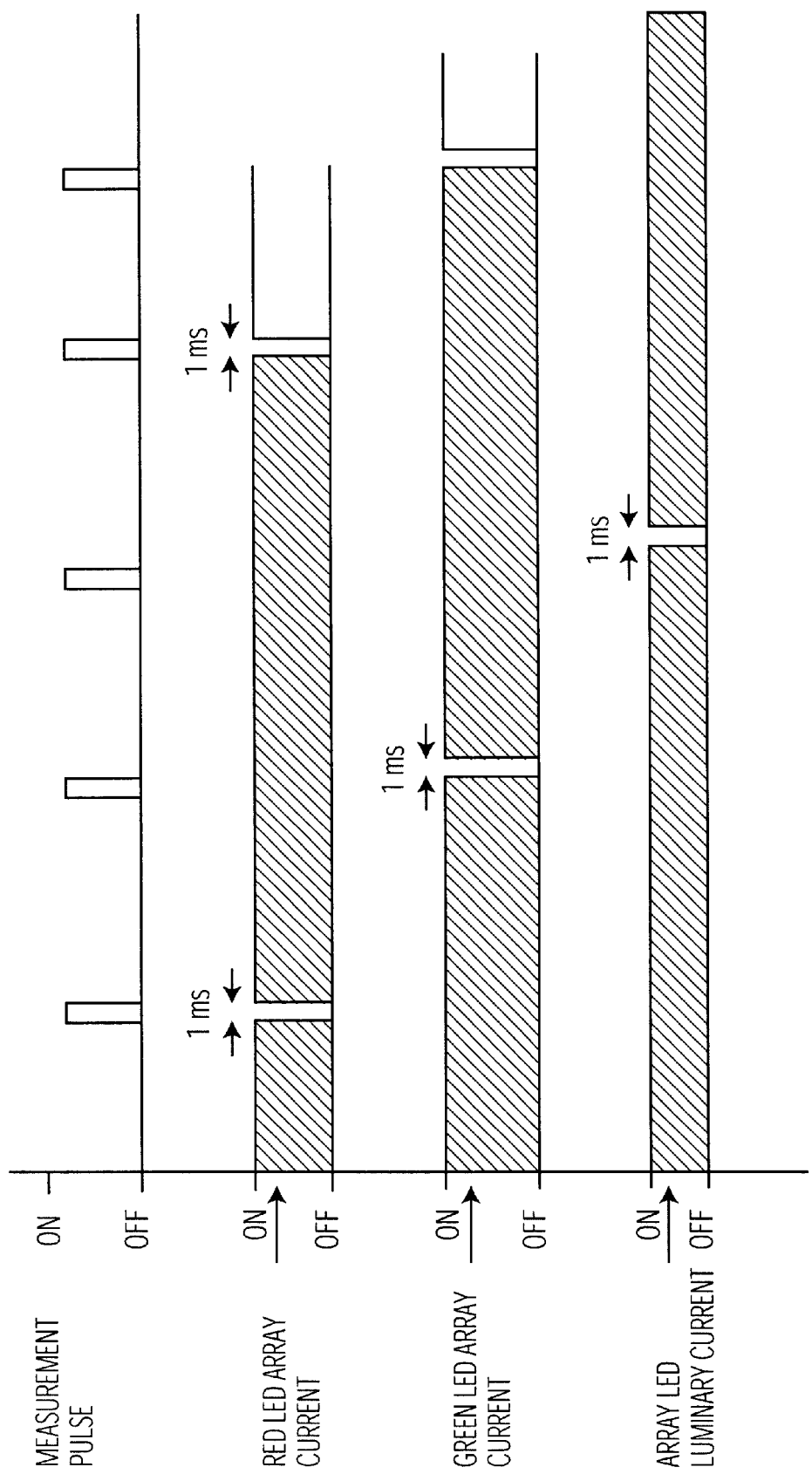
FIG. 4 is a timing diagram for an optical feedback system.

FIG. 4 is a timing diagram illustrating the control logic, which is executed while the luminaire is turned on. The topmost of the four traces is a measuring signal consisting of a series of three pulses (the measuring sequence), separated by a span of time (the measuring interval). During the first pulse, the red LED is turned off so that the photodiode can measure the combined light intensity of the green and blue LEDs; during the second pulse the green LED is turned off so that the photodiode can measure the light intensity of the red and blue LEDs; during the third pulse the blue LED is turned off so that the photodiode can measure the combined light intensity of red and green LED. The control electronics then compares the measured intensities with the desired intensities and adjusts the current to one or more groups of LEDs as may be necessary.

The response time of a typical photodiode is extremely short, and each pulse can be so short than an observer will not detect it, e.g. 1.0 ms. Thus a measuring sequence can be performed during the normal operation of the luminaire. The length of the measuring interval depends on how quickly the light output varies. This depends, for example, on how quickly the temperature of the LEDs is changing. It could range from every minute or less to every few hours; the control logic can be programmed for frequent measurements shortly after start-up, followed by less frequently measurements when stable operating temperature is reached.

It is possible for the luminare to include more than one string of LEDs in each color, and to measure the outputs of the strings individually. In every case it is preferable to adjust the color balance based on all of the measurements in a sequence, rather than adjusting the individual colors based solely on the corresponding light output.

The foregoing is exemplary and not intended to limit the scope of the claims which follow.

Although the drive pulses in each of the channels mentioned above in reference with FIG. 4 is substantially short, for example, in the order of 1–2 ms, many observers may still notice flickers in the emitted light. This follows because the human eye responds to light by integrating the light received in the eyes over intervals of about 15 msec. Therefore, a sensitive eye can observe light interruptions for a period, as short as 400 $\mu$s. It is thus desirable to shorten each turn off period in a measuring sequence to 400 $\mu$s or less. This duration is achieved by including a small filter capacitor in the DC/DC power source (as shown in FIG. 5) to generate fast turn-off and turn-on capabilities.

Figure 5:
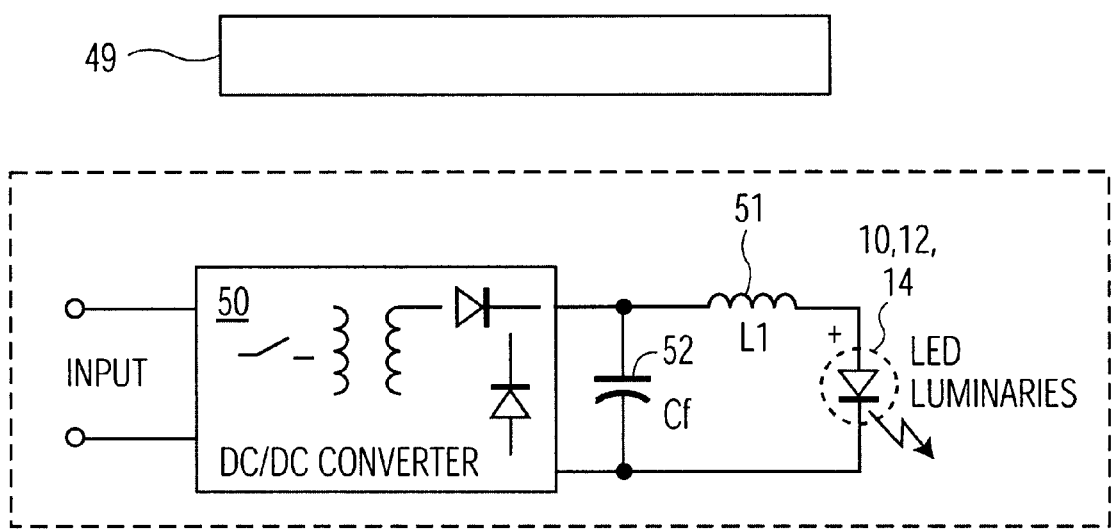
FIG. 5 is a schematic diagram of a DC/DC converter modified to include a small filter inductor.

Referring to FIG. 5, a DC/DC converter system 49 includes a small filter inductor 51 between the LED luminary 10, 12, 14 and a small filter capacitor 52 to reduce turn-off time for the LED luminary. This aids in the elimination of perceptible flicker and is easily implemented. Since the turn-off time is small, the variation in the ambient light within the measurement period can be minimal and the elimination of ambient light from the measurement is more accurate.

Figure 6:
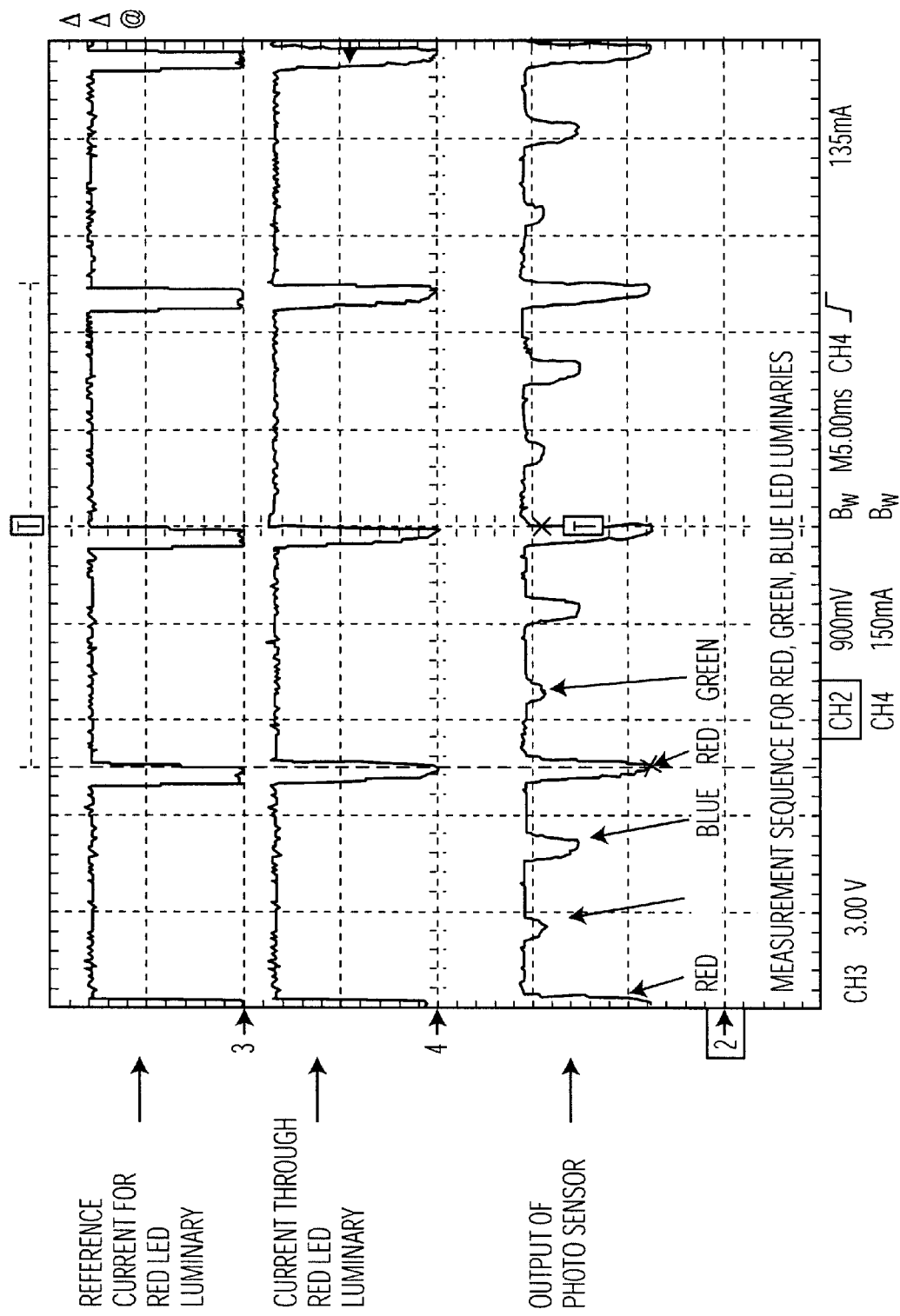
FIG. 6 illustrates a measuring drive sequence.

An alternative embodiment for reducing the turn-off time for the LED luminary is to limit the period of measurement to less than 15 milliseconds. This period is below the integration time of the human eye and will thus not be perceivable. FIG. 6 depicts the reference current for the red LED luminary 10, the current through the red LED 10, and the output of the photosensor 24 with a period of less than 15 milliseconds. Since the measurement sequence has a periodic pattern, it can be implemented using digital circuits.

Compensation for flicker can also be provided for directly. If the light output from the luminary under measurement is increased such that the average light seen by the eye is kept constant during the measurement period, the human eye will not observe the flicker.

Figure 7A:
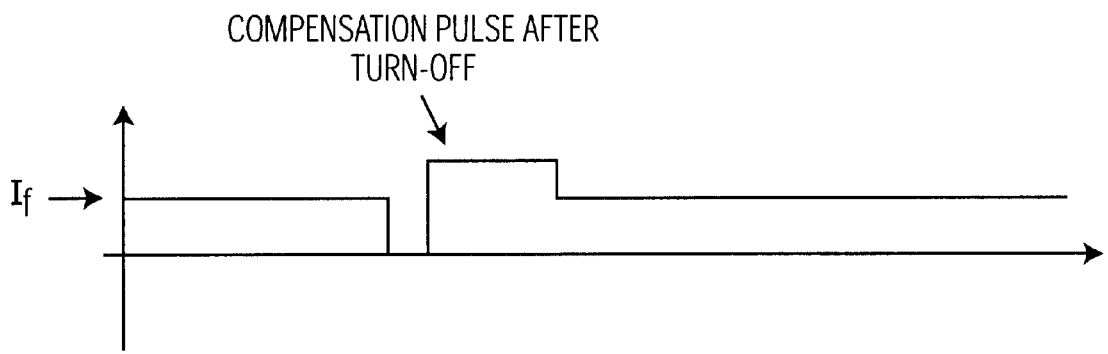
FIG. 7A illustrates a measuring drive sequence with a compensation pulse after a turn-off portion.
Figure 7B:
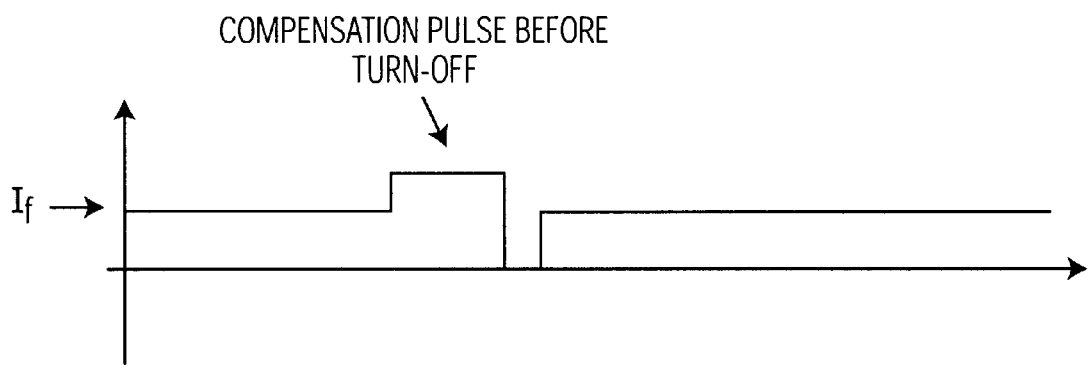
FIG. 7B illustrates a measuring drive sequence with a compensation pulse before a turn-off portion.

In accordance with this embodiment of the invention, the drive pulse of each channel during each measurement sequence is varied to accommodate. for such possible flickers. FIGS. 7A and 7B illustrate an exemplary measuring drive pulse during a measurement sequence in accordance with one embodiment of the invention. Accordingly the measuring drive pulse includes a boost portion proceeding (FIG. 7A) and following (FIG. 7B) the turn-off period. The flicker disappears regardless of the position of the pulse. There are, among other things, three constraints that influence the choice of each measuring drive pulse. First, the boost portion of each pulse is preferably as low as possible to avoid any long-term damage on the LEDs. Second, the turn-off or interruption period is preferably as long as possible to facilitate accurate measurements with less expensive components. Third, the entire sequence of the boost portion and turn off period is preferable around 15 msec, in order to avoid visible artifacts.

Figure 7C:
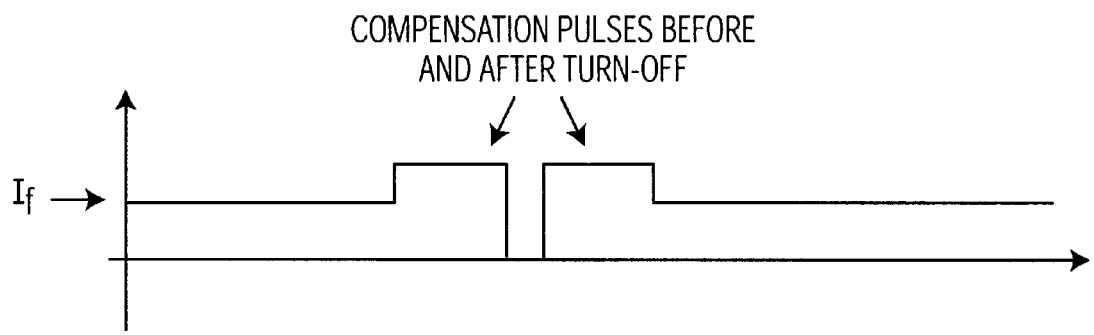
FIG. 7C illustrates a measuring drive sequence with compensation pulses before and after a turn-off portion.

In accordance with one embodiment of the invention, as shown in FIG. 7C, a measuring drive pulse that provides a stable appearance of light level in the LEDs, includes a 5 msec boost to 120% of the nominal light output, followed by a 2 msec complete interruption of current, followed by another 5 msec boost of 120% of the nominal light output.

In accordance with another embodiment of the invention, the drive pulse sequence is symmetric, such that the two boost portions in the sequence exhibit the same amplitude and duration, although the invention is not limited in scope in that respect. For example, in accordance with yet another embodiment of the invention, the measuring drive pulse includes two components comprising a first boost portion followed by a turn-off period. Furthermore, other shapes of measuring drive pulse having at least one boost portion and one turn-off portion may be employed in accordance with the principles of the present invention. Preferably, the pulses are chosen such that, within the integration time of the human eye, i.e. about 15 msec. The average light level of the driven LED is the same as the nominal continuous value during ordinary operation.

In accordance with one embodiment of the invention, the light output is approximately proportional to the drive current, such that a specific percentage of increase in the drive current corresponds to a proportional increase in the light output level. Thus, for example, if it is desired to increase the light output level to 120% as illustrated in FIG. 6A, the increase in current is a predetermined percentage, for example 120% also. Thus, it is possible to employ a measuring drive pulse sequence that includes a specific current boost percentage for all drive levels.

However, LEDs do not necessarily exhibit a proportional relationship between the light output level variations and drive current variations at all operating currents. Thus, in accordance with another embodiment of the invention, in order to achieve a better accuracy in maintaining a constant light output level during measurement sequences, the light vs. current relationship is calibrated for the luminaire, and the boost current values are chosen such that the light level averages to the nominal dc level, at all levels of operation. In order to store the calibrated current vs. light output relationship, intelligent control circuit 30 is configured to include a database that provides the amount of current variation necessary for any desired change in light output level for a range of operating conditions.

What is claimed is:

1. A luminaire comprising:
   an array of LEDs comprising at least one LED in each of a plurality of colors;
   Means for supplying electrical current to said LEDs in each said color, said electrical current including a measuring drive pulse having a measuring period that comprises a "turn off" portion, said LEDs in each said color having a light output, such that said light output has a nominal continuous value during ordinary operation and is interrupted during said "turn off" portion, and the array having a combined light output when current is supplied to all of the LEDs in the array;
   a photodiode arranged to measure the light outputs of at least one of the LEDs in the array; and
   means for selectively turning off the electrical current to one of said LEDs so that said photodiode measures the light output for each color separately in response to said measuring drive pulse.

2. The luminaire in accordance with claim 1 wherein the average light output during the measuring period is substantially equal to the nominal continuous light output during said ordinary operation so as to avoid visible flickers.

3. The luminaire in accordance with claim 2 wherein said measuring drive pulse further comprises a boost portion following said "turn off" period.

4. The luminaire in accordance with claim 2, wherein said measuring drive pulse further comprises a boost portion before said "turn off" period.

5. The luminaire in accordance with claim 2, wherein said measuring drive pulse further comprises a boost portion before and after said "turn off" period.

6. The luminaire in accordance with any one of claims 3–5, wherein said boost portion is greater than 100% and less than 130% of said nominal continuous light value.

7. The luminaire in accordance with claim 6, wherein the duration of said boost portion is approximately 5 msec and duration of said "turn off" period is 2 msec.

8. The luminaire in accordance with claim 2 further comprising means for storing calibrated values associating LED drive current variations with LED light output variations.

9. The luminarie in accordance with claim 1 wherein the means for supplying electric current in said LEDs further comprises separate means for supplying electric current to each individual LED.

10. The luminaire in accordance with claim 9, wherein the separate means for supplying electric current to each individual LED further comprises a converter.

11. The luminaire in accordance with claim 10, wherein the converter is a fly-back converter.

12. The luminaire in accordance with claim 10, wherein the converter is a DC/DC converter.

13. The luminaire in accordance with claim 12, wherein the DC/DC convert further comprise a filter capacitor for the reduction of "turn off" time.

14. The luminaire in accordance with claim 10, wherein the separate means for supplying electric current to each individual LED further comprises a filter inductor.

15. The luminaire in accordance with claim 1, wherein the measuring drive pulse further comprises at least one boost portion.

16. A method for reducing flicker while driving an array of LEDs comprising at least one LED in each of a plurality of colors in a luminaire comprising the steps of:
   supplying electrical current to said LEDs in each said color, such that said LEDs have a light output with a nominal continuous value during ordinary operation;
   measuring a first light level of said LEDs;
   turning off said electrical current to one of said LEDs;
   measuring a second light level of remaining current supplied said LEDs;
   determining the light output of the one of said LEDs by determining the difference between the first light level and the second light level.

17. The method of claim 16, wherein the measuring, turning off, measuring and determining steps are temporally periodically repeated for each of said LEDs.

18. The method in accordance with claim 17, wherein the one of said LEDs can be switched off in the order of microseconds to avoid visible flickers.

19. The method of claim 18, wherein the turn-off time for the one of said LEDs is less than 500 microseconds.

20. The method of claim 19, wherein the turn-off time for the one of said LEDs is less than 300 microseconds.

21. The method of claim 17, wherein the period of measurement can be carried out with a period less than human eye integration time.

22. The method of claim 21, wherein the period of measurement is substantially equal to the nominal continuous light output during said ordinary operation so as to avoid visible flickers.

23. The method of claim 21, wherein the period of measurement is less than 15 milliseconds.

24. The method of claim 17, wherein the average light output remains constant during the periodic repetition.

* * * * *